US006962892B2

(12) United States Patent
Resasco et al.

(10) Patent No.: US 6,962,892 B2
(45) Date of Patent: Nov. 8, 2005

(54) METALLIC CATALYTIC PARTICLE FOR PRODUCING SINGLE-WALLED CARBON NANOTUBES

(75) Inventors: Daniel E. Resasco, Norman, OK (US); Boonyarach Kitiyanan, Norman, OK (US); Jeffrey H. Harwell, Norman, OK (US); Walter Alvarez, Norman, OK (US)

(73) Assignee: The Board of Regents of the University of Oklahoma

( * ) Notice: Subject to any disclaimer, the term of this patent is extended or adjusted under 35 U.S.C. 154(b) by 160 days.

(21) Appl. No.: 10/754,002

(22) Filed: Jan. 8, 2004

(65) Prior Publication Data

US 2004/0186011 A1 Sep. 23, 2004

Related U.S. Application Data

(63) Continuation of application No. 09/988,847, filed on Nov. 19, 2001, now abandoned, which is a continuation of application No. 09/389,553, filed on Sep. 3, 1999, now Pat. No. 6,333,016.
(60) Provisional application No. 60/137,206, filed on Jun. 2, 1999.

(51) Int. Cl.[7] .................................................. D01F 9/12
(52) U.S. Cl. ..................................................... 502/185
(58) Field of Search ........................ 502/185; 423/447.3

(56) References Cited

U.S. PATENT DOCUMENTS

| | | | |
|---|---|---|---|
| 3,746,657 A | 7/1973 | Miller et al. |
| 4,456,694 A | 6/1984 | Blaskie et al. |
| 4,574,120 A | 3/1986 | Thompson |
| 4,663,230 A | 5/1987 | Tennent |
| 5,165,909 A | 11/1992 | Tennent et al. |
| 5,227,038 A | 7/1993 | Smalley et al. |
| 5,300,203 A | 4/1994 | Smalley |
| 5,405,996 A | 4/1995 | Suzuki et al. |
| 5,424,054 A | 6/1995 | Bethune |
| 5,482,601 A | 1/1996 | Ohshima et al. |
| 5,500,200 A | 3/1996 | Mandeville et al. |
| 5,543,378 A | 8/1996 | Wang |
| 5,556,517 A | 9/1996 | Smalley |
| 5,560,898 A | 10/1996 | Uchida et al. |
| 5,578,543 A | 11/1996 | Tennent et al. |
| 5,587,141 A | 12/1996 | Ohshima et al. |
| 5,591,312 A | 1/1997 | Smalley |
| 5,603,907 A | 2/1997 | Grochowski |
| 5,641,466 A | 6/1997 | Ebbesen et al. |
| 5,648,056 A | 7/1997 | Tanaka |
| 5,695,734 A | 12/1997 | Ikazaki et al. |
| 5,698,175 A | 12/1997 | Hiura et al. |
| 5,707,916 A | 1/1998 | Snyder et al. |
| 5,744,235 A | 4/1998 | Creehan |
| 5,747,161 A | 5/1998 | Iijima |
| 5,753,088 A | 5/1998 | Olk |
| 5,773,834 A | 6/1998 | Yamamoto et al. |
| 5,780,101 A | 7/1998 | Nolan et al. |
| 5,814,290 A | 9/1998 | Niu et al. |
| 5,877,110 A | 3/1999 | Snyder et al. |
| 5,965,267 A | 10/1999 | Nolan et al. |
| 5,985,232 A | 11/1999 | Howard et al. |
| 5,997,832 A | 12/1999 | Lieber et al. |
| 6,221,330 B1 | 4/2001 | Moy et al. |
| 6,312,303 B1 | 11/2001 | Yaniv et al. |
| 6,333,016 B1 | 12/2001 | Resasco et al. |
| 6,346,189 B1 | 2/2002 | Dai et al. |
| 6,401,526 B1 | 6/2002 | Dai et al. |
| 6,413,487 B1 | 7/2002 | Resasco et al. |
| 6,426,134 B1 | 7/2002 | Lavin et al. |
| 6,432,866 B1 | 8/2002 | Tennent et al. |
| 6,479,939 B1 | 11/2002 | Yaniv et al. |
| 6,573,643 B1 | 6/2003 | Kumar et al. |
| 6,580,225 B2 | 6/2003 | Yaniv et al. |
| 6,596,187 B2 | 7/2003 | Coll et al. |
| 6,599,961 B1 | 7/2003 | Pienkowski et al. |
| 6,656,339 B2 | 12/2003 | Talin et al. |
| 6,664,722 B1 | 12/2003 | Yaniv et al. |
| 6,699,457 B2 | 3/2004 | Cortright et al. |
| 6,761,870 B1 * | 7/2004 | Smalley et al. .......... 423/447.3 |
| 2001/0031900 A1 | 10/2001 | Margrave et al. |
| 2002/0127169 A1 | 9/2002 | Smalley et al. |
| 2002/0165091 A1 | 11/2002 | Resasco et al. |
| 2003/0077515 A1 | 4/2003 | Chen et al. |
| 2003/0089893 A1 | 5/2003 | Niu et al. |
| 2003/0147802 A1 | 8/2003 | Smalley et al. |
| 2003/0175200 A1 | 9/2003 | Smalley et al. |
| 2003/0180526 A1 | 9/2003 | Winey et al. |
| 2004/0009346 A1 | 1/2004 | Jang et al. |
| 2004/0028859 A1 | 2/2004 | LeGrande et al. |

FOREIGN PATENT DOCUMENTS

| | | |
|---|---|---|
| EP | 0 945 402 A1 | 9/1999 |
| EP | 01 93 9821 | 6/2004 |
| JP | 406122489 | 5/1994 |
| WO | WO 97/09272 | 3/1997 |
| WO | WO 98/39250 | 9/1998 |
| WO | WO 98/42620 | 10/1998 |
| WO | WO 00/17102 | 3/2000 |
| WO | PCT/US00/15362 | 10/2000 |
| WO | WO 00/73205 | 12/2000 |
| WO | WO 03/048038 | 6/2003 |
| WO | PCT/US02/23155 | 7/2003 |
| WO | WO 04/001107 | 12/2003 |
| WO | PCT/US03/19664 | 3/2004 |

OTHER PUBLICATIONS

U.S. Appl. No. 60/101,093, filed Sep. 18, 1998, Smalley et al.

(Continued)

Primary Examiner—Stuart Hendrickson
(74) Attorney, Agent, or Firm—Dunlap, Codding & Rogers, P.C.

(57) ABSTRACT

A metallic catalytic particle for producing single-walled carbon nanotubes. The catalytic particles contain at least one metal from Group VIII, including for example Co, Ni, Ru, Rh, Pd, Ir, and Pt, and at least one metal from Group VIb including for example Mo, W and Cr. The metal component is on a support such as silica.

27 Claims, 11 Drawing Sheets

OTHER PUBLICATIONS

Chattopadhyay, et al., "A Route for Bulk Separation of Semiconducting from Metallic Singel–Wall Carbon Nanotubes", Journal of American Chemical Society, vol. 125, No. 11, pp. 3370–3375, 2003.

Chen et al., "Bulk Separative Enrichment in Metallic or Semiconducting Single–Walled Carbon Nanotubes", Nano Letters, xxxx vol. 0, No. 0, page est: 4.9 A–E.

Patent Abstracts of Japan, vol. 1996, No. 12, Dec. 26, 1996, and JP 0 8 198611 A (NEC CORP), Aug. 6, 1996, Abstract.

Tohji et al., "Purification Procedure for Single–Wall Nanotubes", J. Phys. Chem. B, vol. 101, pp. 1974–1978 (1997).

Alvarez, et al., "Synergism of Co and Mo in the catalytic production of single–wall carbon nanotubes by decomposition of CO", Elsevier Science Ltd., Carbon 39 (2001), pp. 547–558.

Anderson et al., "50 nm Polystyrene Particles via Miniemulsion Polymerization", Macromolecules, American Chemical Society, vol. 35, pp. 574–576, 2002.

Bandow et al., "Effects of the Growth Temperature on the Diameter Distribution and Chirality of Single–Wall Carbon Nanotubes", The American Physical Society, Physical Review Letters, vol. 80, No. 17, (1998), pp. 3779–3782.

Bethune et al. "Cobalt–Catalysed Growth of Carbon Nanotubes with Single–Atomic–Layer Walls", Letters to Nature, vol. 363, pp. 605–607, Jun. 17, 1993.

Bower et al., "Deformation of Carbon Nanotubes in Nanotube–Polymer Composites", Applied Physics Letters, vol. 74, No. 22, pp. 3317–3319, May 31, 1999.

V. Brotons et al., "Catalytic influence of bimetallic phases for the synthesis of single–walled carbon nanotubes", Journal of Molecular Catalysis, A: Chemical, vol. 116, pp. 397–403, Dec, 16, 1997.

Cadek et al., "Mechanical and Thermal Properties of CNT and CNF Reinforced Polymer Composites", Structural and Electronic Properties of Molecular Nanostructures, American Institute of Physics, pp. 562–565, 2002.

Cassell et al., "Large Scale CVD Synthesis of Single–Walled Carbon Nanotubes", J. Phys. Chem. B., American Chemical Society, vol. 103, pp. 6484–6492, 1999.

Chaturvedi et al., "Properties of pure and sulfided NiMoO4 and CoMoO4 catalysts: TPR, XANES and time–resolved XRD studies", Database Accession No.EIX99044490981 XP002246342, Proceedings of the 1997 Mrs Fall Symposium, Boston, MA, USA, Dec. 2–4, 1997; Mater Res Soc. Symp Proc, Materials Research Society Symposium–Proceedings, Recent Advances in Catalytic Materials, 1998, Mrs. Warrendale, PA, USA.

Che et al., "Chemical Vapor Deposition Based Synthesis of Carbon Nanotubes and Nanofibers Using a Template Method", Chemical Mater., vol. 10, pp. 260–267, 1998.

Chen et al., "Dissolution of Full–Length Single–Walled Carbon Nanotubes", J. Phys. Chem. B, vol. 105, pp. 2525–2528, 2001.

Chen et al., "Growth of carbon nanotubes by catalytic decompositon of $CH_4$ or CO on a Ni–MgO catalyst", Carbon vol. 35, No. 10–11, pp. 1495–1501, 1997.

Cheng et al., "Bulk Morphology and Diameter Distribution of Single–Walled Carbon Nanotubes Synthesized by Catalytic Decomposition of Hydrocarbons", Chemical Physics Letters, vol. 289, pp. 602–610, Jun. 19, 1998.

Cheng et al., "Large–Scale and Low–cost Synthesis of Single–Walled Carbon Nanotubes by the Catalytic Prolysis of Hydrocarbons", Applied Physics Letters, vol. 72, No. 25, pp. 3282–3284, Jun. 22, 1998.

Dai et al., "Single–Wall Nanotubes Produced By Metal–Catalyzed Disproportionation of Carbon Monoxide", Chemical Physics Letters, vol. 260, pp. 471–475, Sep. 27, 1996.

Database, Accession No. 1999–366878, Cano, "Canon KK", XP–002149235, May 25, 1999.

De Boer et al., "The cobalt–molybdenum interaction in $CoMo/SiO_2$ catalysts: A CO–oxidation study", Elsevier Science Ltd., Solid State Ionics 63–65 (1993), pp. 736–742.

Deng et al., "Hybrid Composite of Polyaniline Containing Carbon Nanotube", Chinese Chemical Letters, vol. 12, pp. 1037–1040, 2001.

Fonseca et al., "Synthesis of single–and multi–wall carbon nanotubes over supported catalysts", Applied Physics A, vol. 67, pp. 11–22, 1998.

Franco et al., "Electric and magnetic properties of polymer electrolyte/carbon black composites", Solid State Ionics 113–115, pp. 149–160, 1998.

Gaspar et al., "The influence of Cr precursors in the ethylene polymerization on $Cr/SiO_2$ catalysts", Applied Catalysis A: General, vol. 227, pp. 240–254, 2002.

Gong et al., "Surfactant–Assisted Processing of Carbon Nanotube/Polymer Composites", Chemical Material, vol. 12, pp. 1049–1052, 2000.

Govindaraj et al., "Carbon structures obtained by the disproportionation of carbon monoxide over nickel catalysts", Materials Research Bullentin, vol. 33, No. 4, pp. 663–667, 1998.

Hafner et al., "Catalytic growth of single–wall carbon nanotubes from metal particles", Chemical Physics Letters, vol. 296, pp. 195–202, 1998.

Hamon et al., "End–group and defect analysis of solube single–walled carbon nanotubes", Chemical Physics Letters, vol. 347 pp. 8–12, 2001.

Hernadi et al., "Catalytic synthesis of carbon nanotubes using zeolite support", Elsevier Science Inc. 1996.

Hwang et al., "Carbon nanotube reinforced ceramics", Journal of Materials Chemistry, vol. 11, pp. 1722–1725, 2001.

Hyperion Catalysis International Website; http://www.fibrils.com/esd.htm;"Unique Slough Resistant SR™ Series ESD Thermoplastic Product Line Offers Reduced Particle Contamination For Demanding Electronic Applications," and Hyperion Homepage http://www.fibrils.com.

Iijima, "Helical Microtubules of Graphitic Carbon", Letters to Nature, vol. 354, pp. 56–58, Nov. 7, 1991.

Iijima et al., "Single–Shell Carbon Nanotubes of 1–nm Diameter", Letters to Nature, vol. 363, pp. 603–605, Jun. 17, 1993.

Ivanov et al., "The Study of Carbon Nanotubules Produced by Catalytic Method", Chemical Physics Letters, vol. 223, pp. 329–335, 1994.

Jin et al., "Alignment of Carbon nanotubes in a polymer matrix by mechanical stretching", Applied Physics Letters, vol. 73, No. 9, pp. 1197–1199, Aug. 31, 1998.

Journet et al., "Large–Scale Production of Single–Walled Carbon Nanotubes by the Electric–Arc Technique", Letters to Nature, vol. 338, pp. 756–758, Aug. 21, 1997.

Kitiyanan et al., "Controlled production of single-wall carbon nanotubes by catalytic decomposition of CO on bimetallic Co-Mo catalysts", Chemical Physics Letters, vol. 317, pp. 497-503, Feb. 4, 2000.

Krishnankutty et al., "The Effect of Copper on the Structural Characteristics of Carbon Filaments Produced from Ion Catalyzed Decomposition of Ethylene," Catalysts Today, vol. 37, pp. 295-307, 1997.

Landfester et al., "Miniemulsion polymerization", Jun. 4, 2003, http://www.mpikg-golm.mpg.de/kc/landfester/, 1-22.

Landfester, "Polyreactions in Miniemulsions", Macromol. Rapid Commun., vol. 22, No. 12, pp. 896-936, 2001.

Landfester, "The Generation of Nanoparticles in Miniemulsions", Advanced Materials, vol. 13, No. 10, pp. 765-768, May 17, 2001.

Li et al., "Large-Scale Synthesis of Aligned Carbon Nanotubes", Science, vol. 274, pp. 1701-1703, Dec. 6, 1996.

McCarthy et al., "A Microscopic and Spectroscopic Study of Interactions between Carbon Nanotubes and a Conjugated Polymer", J. Phys. Chem. B, vol. 106, pp. 2210-2216, 2001.

Niyogi et al., Communications to the Editor, "Chromatographic Purification of Soluble Single-walled Carbon Nanotubes (s-SWNTs)", J. Am. Chem. Soc., vol. 123, pp. 733-734, 2001.

Pompeo et al., "Water Solubilization of Single-Walled Carbon Nanotubes by Functionalized with Glucosamine", Nano Letters, American Chemical Society, vol. 2, No. 4, pp. 369-373, 2002.

Qian et al., "Load transfer and deformation mechanisms in carbon nanotube-polystrene composites",Applied Physics Letters, American Institute of Physics, vol. 76, No. 20, 2868-2870, May 15, 2000.

Razavi, "Metallocene catalysts technology and environment", Chemistry 3, pp. 615-625, 2000.

Rinzler et al., "Large-Scale Purification of Single Wall Carbon Nanotubes: Process, Product, and Characterization," Applied Physics A, vol. 67, pp. 29-37, 1998.

Sears et al., "Raman scattering from polymerizing styrene. I. Vibrational mode analysis )", J. Chem. Phys., vol. 75, no. 4, pp. 1589-1598.

Shaffer et al., "Fabrication and Characterization of Carbon Nanotube/Poly (vinyl alcohol) Composites**", Advanced Materials, vol. II, No. 11, pp. 937-941, 1999.

Thess et al., "Crystalline Ropes of Metallic Carbon Nanotubes", Science, vol. 273, pp. 483-487, Jul. 26, 1996.

Tiarks et al., "Encapsulation of Carbon Black by Miniemulsion Polymerization", Macromol. Chem. Phys., vol. 202, pp. 51-60, 2001.

Tiarks et al., "Silica Nanoparticles as Surfactants and Fillers for Latexes Made by Miniemulsion Polymerization", Langmuir, American Chemical Society, vol. 17, pp. 5775-5780, 2001.

Willems et al., "Control of the outer diameter of thin carbon nanotubes synthesized by catalytic decomposition of hydrocarbons", Chemical physics Letters, vol. 317, pp. 71-76, Jan. 28, 2000.

Yakobson et al.; "Fullerene Nanotubes: $C_{1,000,000}$ and Beyond," American Scientist, vol. 85, pp. 324-337, Jul.-Aug. 1997.

Zhao, et al., "Chromatographic Purification and Properties of Soluble Single-Walled Carbon Nanotubes", American Chemical Society, Page Est: 4.1, pp. A-E, Feb. 22, 2001.

Zhu et al., "Direct Synthesis of Long Single-Walled Carbon Nanotube Strands", Science, vol. 296, pp. 884-886, May 13, 2002.

* cited by examiner

METALLIC CATALYTIC PARTICLE FOR PRODUCING SINGLE-WALLED CARBON NANOTUBES

CROSS-REFERENCE TO RELATED APPLICATIONS

The present application is a continuation of U.S. Ser. No. 09/988,847, filed Nov. 19, 2001 now abandoned; which is a continuation of U.S. Ser. No. 09/389,553, filed Sep. 3, 1999, now U.S. Pat. No. 6,333,016, which claims the benefit of U.S. Provisional Application Ser. No. 60/137,206, filed Jun. 2, 1999, each of which are hereby incorporated by reference herein in their entireties.

STATEMENT REGARDING FEDERALLY SPONSORED RESEARCH OR DEVELOPMENT

Not Applicable.

BACKGROUND OF THE INVENTION

1. Field of the Invention

This invention is related to the field of producing carbon nanotubes, and more particularly, but not by way of limitation, to methods of producing single-walled carbon nanotubes.

2. Brief Description of the Prior Art

Carbon nanotubes (also referred to as carbon fibrils) are seamless tubes of graphite sheets with full fullerene caps which were first discovered as multi-layer concentric tubes or multi-walled carbon nanotubes and subsequently as single-walled carbon nanotubes in the presence of transition metal catalysts. Carbon nanotubes have shown promising applications including nanoscale electronic devices, high strength materials, electron field emission, tips for scanning probe microscopy, and gas storage.

Generally, single-walled carbon nanotubes are preferred over multi-walled carbon nanotubes for use in these applications because they have fewer defects and are therefore stronger and more conductive than multi-walled carbon nanotubes of similar diameter. Defects are less likely to occur in single-walled carbon nanotubes than in multi-walled carbon nanotubes because multi-walled carbon nanotubes can survive occasional defects by forming bridges between unsaturated carbon valances, while single-walled carbon nanotubes have no neighboring walls to compensate for defects.

However, the availability of these new single-walled carbon nanotubes in quantities necessary for practical technology is still problematic. Large scale processes for the production of high quality single-walled carbon nanotubes are still needed.

Presently, there are three main approaches for synthesis of carbon nanotubes. These include the laser ablation of carbon (Thess, A. et al., Science 273, 483 (1996)), the electric arc discharge of graphite rod (Journet, C. et al., Nature 388,756 (1997)), and the chemical vapor deposition of hydrocarbons (Ivanov, V. et al., Chem. Phys. Lett 223, 329 (1994); Li A. et al., Science 274, 1701 (1996)). The production of multi-walled carbon nanotubes by catalytic hydrocarbon cracking is now on a commercial scale (U.S. Pat. No. 5,578,543) while the production of single-walled carbon nanotubes is still in a gram scale by laser (Rinzler, A. G. et al., Appl. Phys. A. 67, 29 (1998)) and arc (Haffner, J. H. et al., Chem. Phys. Lett. 296, 195 (1998)) techniques.

Unlike the laser and arc techniques, carbon vapor deposition over transition metal catalysts tends to create multi-walled carbon nanotubes as a main product instead of single-walled carbon nanotubes. However, there has been some success in producing single-walled carbon nanotubes from the catalytic hydrocarbon cracking process. Dai et al. (Dai, H. et al., Chem. Phys. Lett 260, 471 (1996)) demonstrate web-like single-walled carbon nanotubes resulting from disproportionation of carbon monoxide (CO) with a molybdenum (Mo) catalyst supported on alumina heated to 1200° C. From the reported electron microscope images, the Mo metal obviously attaches to nanotubes at their tips. The reported diameter of single-walled carbon nanotubes generally varies from 1 nm to 5 nm and seems to be controlled by the Mo particle size. Catalysts containing iron, cobalt or nickel have been used at temperatures between 850° C. to 1200° C. to form multi-walled carbon nanotubes (U.S. Pat. No. 4,663,230). Recently, rope-like bundles of single-walled carbon nanotubes were generated from the thermal cracking of benzene with iron catalyst and sulfur additive at temperatures between 1100–1200° C. (Cheng, H. M. et al., Appl. Phys. Lett. 72, 3282 (1998); Cheng, H. M. et al., Chem. Phys. Lett. 289, 602 (1998)). The synthesized single-walled carbon nanotubes are roughly aligned in bundles and woven together similarly to those obtained from laser vaporization or electric arc method. The use of laser targets comprising one or more Group VI or Group VIII transition metals to form single-walled carbon nanotubes has been proposed (WO98/39250). The use of metal catalysts comprising iron and at least one element chosen from Group V (V, Nb and Ta), VI (Cr, Mo and W), VII (Mn, Tc and Re) or the lanthamides has also been proposed (U.S. Pat. No. 5,707, 916). However, methods using these catalysts have not been shown to produce quantities of nanotubes having a high ratio of single-walled carbon nanotubes to multi-walled carbon nanotubes.

In addition, the separation steps which precede or follow the reaction step represent the largest portion of the capital and operating costs required for production of the carbon nanotubes. Therefore, the purification of single-walled carbon nanotubes from multi-walled carbon nanotubes and contaminants (i.e., amorphous and graphitic carbon) may be substantially more time consuming and expensive than the actual production of the carbon nanotubes.

Further, one of the greatest limitations in the current technology is the inability to obtain a simple and direct quantification of the different forms of carbon obtained in a particular synthesis. Currently, transmission electron microscopy (TEM) is the characterization technique most widely employed to determine the fraction of single-walled carbon nanotubes present in a particular sample. However, transmission electron microscopy can only provide a qualitative description of the type of carbon species produced. It is hard to determine how representative of the overall production a given transmission electron microscopic image can be. Obtaining semi-quantitative determinations of the distribution of different carbon species in a sample with any statistical significance is time consuming, and the method employing transmission electron microscopy could not be applied as a routine quality control to large-scale operations.

Therefore, new and improved methods of producing nanotubes which enable synthesis of commercial quantities of substantially pure single-walled carbon nanotubes and at lower temperatures than previously reported, as well as methods to directly quantify the different forms of carbon obtained in a particular synthesis, are being sought. It is to such methods of producing nanotubes and quantifying synthesis products that the present invention is directed.

SUMMARY OF THE INVENTION

According to the present invention, a method for producing carbon nanotubes is provided which avoids the defects and disadvantages of the prior art. Broadly, the method includes contacting, in a reactor cell, metallic catalytic particles with an effective amount of a carbon-containing gas at a temperature sufficient to catalytically produce carbon nanotubes, wherein a substantial portion of the carbon nanotubes are single-walled carbon nanotubes, and the metallic catalytic particle includes a Group VIII metal, excluding iron, and a Group VIb metal.

Further, according to the present invention, a method is provided for determining catalyst composition and reaction conditions for optimizing production of single-walled carbon nanotubes. Broadly, the method includes contacting, in a reactor cell, a sample of a product produced by the method for producing carbon nanotubes with an effective amount of an oxygen-containing gas to oxidize carbon present in the sample while increasing the temperature within the reactor cell. The amount of carbon dioxide released by the sample is measured, and the specific carbon species present in the sample is determined by the release of carbon dioxide from the sample at specific temperatures. The catalyst composition and/or reaction conditions are altered until single-walled carbon nanotubes are present in substantially higher quantities than all other carbon species in the sample of the product containing nanotubes.

In one aspect of the invention, the metallic catalytic particle is a bimetallic catalyst deposited on a support such as silica. The ratio of the Group VIII metal to the Group VIb metal in the bimetallic catalyst is in the range of from about 1:5 to about 2:1.

An object of the present invention is to provide a method for producing single-walled carbon nanotubes in greater quantities and at lower temperatures.

Another object of the present invention is to provide methods for determining quantitatively the different forms of carbon, including single-walled carbon nanotubes, multi-walled carbon nanotubes, and amorphous carbon, present in a sample, and thereby determine the selectivity of a particular catalyst and optimize reaction conditions for producing carbon nanotubes.

Other objects, features and advantages of the present invention will become apparent from the following detailed description when read in conjunction with the accompanying figures and appended claims.

DETAILED DESCRIPTION OF THE INVENTION

Figure 1:
FIG. 1 is a transmission electron microscopic image of single-walled carbon nanotubes from CO disproportionation catalyzed by a Co/Mo catalyst on $SiO_2$ at 700° C. (100,000 magnification).
Figure 2:
FIG. 2 is a transmission electron microscopic image of the sample employed in FIG. 1 at higher resolution. (400,000 magnification) showing bundles of single-walled carbon nanotubes (SWNTs).
Figure 3:
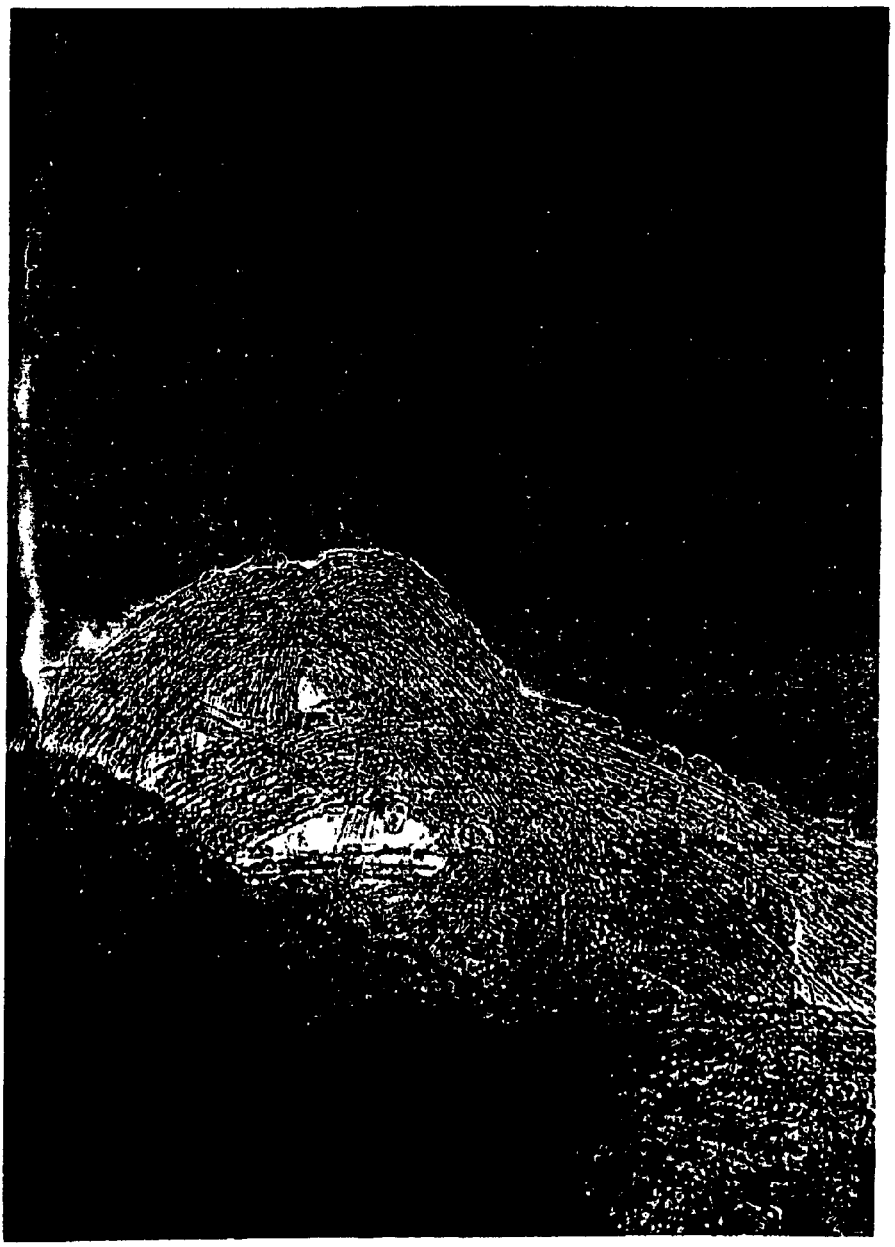
FIG. 3 is a transmission electron microscopic image of the sample employed in FIG. 1 showing aligned single-walled carbon nanotubes growing in bundles.
Figure 4:
FIG. 4 is a transmission electron microscopic image of the sample employed in FIG. 1 showing an end view of a single-walled carbon nanotube bundle.

The present invention is directed to a method for producing quantities of single-walled carbon nanotubes by passing an effective amount of a carbon-containing gas over bimetallic catalytic particles, which consist essentially of a Group VIII and a Group VIb metal, at relatively low temperatures; and a method for obtaining a reliable quantitative measurement of the yield of single-walled carbon nanotubes present in a product containing carbon nanotubes.

Broadly, the method for producing single-walled carbon nanotubes comprises contacting bimetallic catalytic particles consisting essentially of a Group VIII and a Group VIb metal with an effective amount of a carbon-containing gas in a reactor heated to a temperature of from about 500° C. to 1200° C., preferably from about 600° C. to about 850° C., and more preferably from about 650° to about 750° C. and most preferably about 700° C. The carbon-containing gas may be supplied to a reactor in a continuous flow or may be maintained in a stagnant atmosphere.

The phrase "an effective amount of a carbon-containing gas" as used herein means a gaseous carbon species present in sufficient amounts to result in deposition of carbon on the metallic catalytic particles at elevated temperatures such as those described hereinbefore, resulting in formation of carbon nanotubes.

The metallic catalytic particles as described herein include a catalyst component. The catalyst as provided and employed in the present invention is bimetallic. The bimetallic catalyst contains one metal from Group VIII including Co, Ni, Ru, Rh, Pd, Ir, and Pt, and one metal from Group VIb including Cr, W and Mo. Specific examples of bimetallic catalysts which may be employed by the present invention include Co—Cr, Co—W, Co—Mo, Ni—Cr, Ni—W, Ni—Mo, Ru—Cr, Ru—W, Ru—Mo, Rh—Cr, Rh—W, Rh—Mo, Pd—Cr, Pd—W, Pd—Mo, Ir—Cr, Ir—W, Ir—Mo, Pt—Cr, Pt—W, and Pt—Mo. Especially preferred catalysts of the present invention comprise Co—Mo, Co—W, Ni—Mo and Ni—W.

A synergism exists between the two metal components of the bimetallic catalyst in that metallic catalytic particles containing the bimetallic catalyst are much more effective catalysts for the production of single-walled carbon nanotubes than metallic catalytic particles containing either one or the other metal component as a catalyst. This synergistic effect observed with the bimetallic catalyst will be described in more detail hereinafter.

The ratio of the Group VIII metal to the Group VIb metal in the metallic catalytic particles also affects the selective production of single-walled carbon nanotubes by the method of the present invention. The ratio of the Group VIII metal to the Group VIb metal is preferably from about 1:10 to about 15:1, and more preferably about 1:5 to about 2:1. Generally, the concentration of the Group VIb metal (e.g., Mo) will exceed the concentration of the Group VIII metal (e.g. Co) in metallic catalytic particles employed for the selective production of single-walled carbon nanotubes.

The metallic catalytic particles may comprise more than one metal from each of Groups VIII and VIb as long as at least one metal from each Group is present. For example, the metallic catalytic particles may comprise (1) more than one Group VIII metal and a single Group VIb metal, (2) a single Group VIII metal and more than one Group VIb metal, or (3) more than one Group VIII metal and more than one Group VIb metal.

The bimetallic catalyst may be prepared by simply mixing the two metals. The bimetallic catalyst can also be formed in situ through decomposition of a precursor compound such as bis (cyclopentadienyl) cobalt or bis (cyclopentadienyl) molybdenum chloride.

The catalyst is preferably deposited on a support such as silica ($SiO_2$), MCM-41 (Mobil Crystalline Material-41), alumina ($Al_2O_3$), MgO, Mg(Al)O (aluminum-stabilized magnesium oxide), $ZrO_2$, molecular sieve zeolites, or other oxidic supports known in the art.

The metallic catalytic particle, that is, the catalyst deposited on the support, may be prepared by evaporating the metal mixtures over flat substrates such as quartz, glass, silicon, and oxidized silicon surfaces in a manner well known to persons of ordinary skill in the art.

The total amount of bimetallic catalyst deposited on the support may vary widely, but is generally in an amount of from about 1% to about 20% of the total weight of the metallic catalytic particle, and more preferably from about 3% to about 10% by weight of the metallic catalytic particle.

In an alternative version of the invention the bimetallic catalyst may not be deposited on a support, in which case the metal components comprise substantially 100% of the metallic catalytic particle.

Examples of suitable carbon-containing gases include aliphatic hydrocarbons, both saturated and unsaturated, such as methane, ethane, propane, butane, hexane, ethylene and propylene; carbon monoxide; oxygenated hydrocarbons such as acetone, acetylene and methanol; aromatic hydrocarbons such as toluene, benzene and naphthalene; and mixtures of the above, for example carbon monoxide and methane. Use of acetylene promotes formation of multi-walled carbon nanotubes, while CO and methane are preferred feed gases for formation of single-walled carbon nanotubes.

The carbon-containing gas may optionally be mixed with a diluent gas such as helium, argon or hydrogen.

In a preferred version of the invention the bimetallic catalyst particles are disposed within a reactor cell, such as a quartz tube, which is disposed within a furnace or oven, and the carbon-containing gas is passed into the reactor cell. Alternatively, the sample can be heated by microwave radiation. The process may be continuous, wherein the metallic catalytic particles and carbon-containing gas are continuously fed and mixed within the reactor, or the process may be a batch process wherein the carbon-containing gas and metallic catalytic particles are disposed within the reactor cell and held therein for the duration of the reaction period.

Alternatively, the metallic catalytic particles may be mixed with electrodes in an arc discharge system to produce single-walled carbon nanotubes and/or multi-walled carbon nanotubes. Alternatively, the metallic catalytic particles may be used in a system exposed to a plasma discharge induced by microwaves. After the catalytic process has been completed, the metallic catalytic particles and the nanotubes are removed from the reactor. The nanotubes are separated from the metallic catalytic particles by methods known to those of ordinary skill in the art. Further discussion of such methods is not deemed necessary herein.

The single-walled carbon nanotubes produced herein generally have an external diameter of from about 0.7 nm to about 5 nm. Multi-walled carbon nanotubes produced herein generally have an external diameter of from about 2 nm to about 50 nm.

The method of obtaining a reliable quantitative measurement of the yield of single-walled carbon nanotubes is direct and easy to conduct, so that changes in selectivity or steady-state production can be readily detected, facilitating reproducibility and quality control. This method is based on the Temperature Programmed Oxidation (TPO) technique (Krishnankutty, N. et al. Catalysis Today, 37, 295 (1997)), which is well known in the art. This technique is frequently used to assess the crystallinity of carbon and is based on the concept that highly graphitic materials will be more resistant to oxidation than those possessing a short range crystalline order. In the present invention, this technique is adapted to provide a method to determine the selectivity of the production of single-walled carbon nanotubes over multi-walled carbon nanotubes, as well as the percentages of total solid product constituted by each carbon species, including not only single- and multi-walled carbon nanotubes but also amorphous and graphitic carbon species. Therefore, this method, in combination with the method for production of carbon nanotubes as described in detail hereinbefore, will allow for the controlled production of single-walled carbon nanotubes. However, it will be understood that this method can also be used for analysis of any sample containing carbon nanotubes.

Broadly, the method includes passing a continuous flow of a gas containing oxygen dispersed in a carrier gas, such as 5% oxygen in helium, over a sample containing carbon nanotubes, such as a catalyst containing carbon deposits, while the temperature is linearly increased from ambient temperature to about 800° C. The oxygen-containing gas is provided in an amount effective to oxidize carbon species present in the sample. Oxidation of a carbon species results in the evolution of carbon dioxide, and each carbon species, such as single- or multi-walled carbon nanotubes, amorphous carbon, or graphite, is oxidized at a different temperature. The evolution of $CO_2$ produced by the oxidation of each carbon species present in the sample is monitored by a mass spectrometer. The evolved carbon dioxide is quantified by calibrating with pulses of known amounts of pure carbon dioxide and oxidation of known amounts of graphite, thereby yielding a direct measurement of the amount of carbon which is oxidized at each temperature. That is, each mol of carbon dioxide detected by the mass spectrometer corresponds to one mol of carbon of the particular species which is oxidized at a given temperature.

This quantitative method which incorporates the use of Temperature Programmed Oxidation, referred to hereinafter as the Temperature Programmed Oxidation method, is particularly suitable for the quantitative characterization of single-walled carbon nanotubes because single-walled carbon nanotubes are oxidized in a relatively narrow temperature range, which lies above the temperature of oxidation of amorphous carbon and below the temperature of oxidation of multi-walled carbon nanotubes and graphitic carbon. For instance, the oxidation temperature of single-walled carbon nanotubes has been shown to be 100° C. higher than that of $C_{60}$ fullerenes and 100° C. lower than that of multi-walled carbon nanotubes by this method. A similar result has been obtained by the thermo-gravimetric analysis (TGA) method (Rinzler, A. G. et al., Appl. Phys. A, 67, 29 (1998)), confirming the suitability of this method for the quantitation of single-walled carbon nanotubes.

The method of Temperature Programmed Oxidation analysis as described herein can be used to quickly test different catalyst formulations and operating conditions of nanotube production methods to optimize the production of single-walled carbon nanotubes. For example, the optimum bimetallic catalyst present in the metallic catalytic particles, as well as the optimum molar ratio of the two metals, can be determined by Temperature Programmed Oxidation. Temperature Programmed Oxidation can also be used to optimize the reaction conditions, such as temperature, time and concentration of carbon in the carbon-containing gas. For instance, Temperature Programmed Oxidation results from products run at different reaction temperatures illustrate that the amount of carbon deposited increases as the temperature decreases, but the selectivity to produce single-walled carbon nanotubes is lower at low temperatures. Therefore, Temperature Programmed Oxidation can be used to find the optimum reaction temperature for any particular catalyst.

Now it will be understood that although optimization of single-walled carbon nanotube production has been discussed in detail herein, the same method may be used to optimize production of multi-walled carbon nanotubes.

The amount of graphite, amorphous carbon and other carbon residues formed during the catalytic process are minimized due to the reduced temperatures that are employed. The amount by weight of graphite or amorphous carbon produced is less than 40% by weight of the total solid material formed during the process, preferably less than 30%, more preferably less than 20%, and even more preferably less than 10%. Most preferably, the amount of graphite, amorphous carbon, and other solid carbon residue make up less than 5% of the total solid product of the catalytic process.

The Temperature Programmed Oxidation method as described herein appears to be the first method described which has the ability to not only determine which carbon species is present in a sample but also determine the percent of each carbon species present in the sample. This is particularly helpful in determining what purification steps, if any, should be undertaken before use of the single-walled carbon nanotubes in various applications. Since the purification steps can be more time consuming and expensive than the actual carbon nanotube production itself, the value of the Temperature Programmed Oxidation method is clearly evident.

The nanotubes produced herein may be used in a variety of applications. For example, they can be used as reinforcements in fiber-reinforced composite structures or hybrid composite structures (i.e. composites containing reinforcements such as continuous fibers in addition to nanotubes). The composites may further contain fillers such as carbon black, silica, and mixtures thereof. Examples of reinforceable matrix materials include inorganic and organic polymers, ceramics (e.g., Portland cement), carbon, and metals (e.g., lead or copper). When the matrix is an organic polymer, it may be a thermoset resin such as epoxy, bismaleimide, polyimide, or polyester resin; a thermoplastic resin; or a reaction injection molded resin. The nanotubes can also be used to reinforce continuous fibers. Examples of continuous fibers that can be reinforced or included in hybrid composites are aramid, carbon, glass fibers, and mixtures thereof. The continuous fibers can be woven, knit, crimped, or straight.

The invention will be more fully understood by reference to the following examples. However, the examples are merely intended to illustrate desirable aspects of the invention and are not to be construed to limit the scope of the invention.

EXAMPLE 1

Bimetallic catalytic particles containing 10 wt % of mixed cobalt and molybdenum (1:1 ratio) on a silica substrate were prepared by the incipient wetness impregnation method, in which an appropriate amount of Cobalt Nitrate and Ammonium Heptamolybdate Tetrahydrate were dissolved together in deionized water and gradually dropped on the silica. Ceramic mortar and pestle were utilized to disperse the metals on silica. The resulting bimetallic catalytic particles were then left to dry at ambient conditions for a few hours. The partially dried bimetallic catalytic particles were then dried in an oven at 80° C. for 12 hours. The dry bimetallic catalytic particles were then calcined in flowing air at 450° C.

For production of nanotubes, 0.1 g of calcined bimetallic catalytic particles was placed in a vertical quartz tube reactor having an arc inside diameter of 8 mm. The vertical quartz tube reactor containing the calcined bimetallic catalytic particles was disposed inside a furnace which was equipped with a thermocouple and temperature control. Hydrogen gas (85 cm$^3$/min) was passed into the reactor from the top of the reactor. The furnace temperature was linearly raised at a rate of 20° C./min from room temperature to 450° C. After 450° C. was reached, hydrogen flow passed into the reactor for an additional 30 min. The reactor temperature was then increased to 600–700° C. in helium gas. Subsequently, carbon monoxide gas (50% carbon monoxide/50% helium) was introduced into the reactor at a flowrate of 100 cm$^3$/min. The contact time of CO with the calcined bimetallic catalytic particles was varied between 15 minutes and 2 hours. After contacting for the prescribed period of time, the furnace was turned off and the product was cooled down in helium to room temperature.

After reaction, the color of the sample had turned to a deep black. For transmission electron microscopic analysis of the product, a portion of the product was suspended in distilled water by sonication with ultra-sound. A few drops of such suspension were deposited on lacey carbon supported on a copper grid. The portion of the product was then dried and inspected in a transmission electron microscope, model JEOL JEM-2000FX at 200 kV. As shown in the transmission electron microscopic images (FIGS. 1–4), the amount of single-walled carbon nanotubes produced is clearly seen in large quantities. It is observed that these single-walled carbon nanotubes lay together, roughly aligned as bundles. The transmission electron microscopic images also reveal that the bundles of single-walled carbon nanotubes are coated with amorphous carbon as from other methods. Most tubes are about 1 nm in diameter, with a few having larger diameters, up to 3.2 nm.

Figure 5:
FIG. 5 is a scanning electron microscopic image of the sample employed in FIG. 1 showing a single-walled carbon nanotube bundle growing out from the catalytic surface.

Following transmission electron microscopic analysis, the product was scanned using a scanning electron microscope, model JEOL JSM-880. The scanning electron microscopic image represented in FIG. 5 shows the bundles of single-walled carbon nanotubes on the surface of silica.

EXAMPLE 2

Metallic catalytic particles containing the monometallic catalysts of Ni, Co or Mo supported on silica were also prepared by the same methodology described in Example 1, and their catalytic properties were compared to that of metallic catalytic particles containing the bimetallic catalyst. After conducting the same treatment in CO at 700° C. as described in Example 1, and doing the same transmission electron microscopic analysis, no single-walled carbon nanotubes were observed on these samples. This result indicates that there is a synergism between Co and Mo that makes the combination of two metals, which separately cannot produce single-walled carbon nanotubes at this temperature, a very effective formulation.

EXAMPLE 3

A series of metallic catalytic particles containing 6 wt % Co—Mo bimetallic catalysts were prepared on different supports ($SiO_2$, MCM-41, $Al_2O_3$, Mg(Al)O, and $ZrO_2$), and their nanotube production abilities were compared, following the same CO disproportionation methodology as employed in Example 1. Table 1 summarizes the results of these experiments.

EXAMPLE 4

Following the same procedure as that in Example 1, it was observed that metallic catalytic particles containing a Co—W bimetallic catalyst deposited on $SiO_2$ with a Co/W molar ratio of 1.0 gave similar production of single-walled carbon nanotubes as that of the Co—Mo/$SiO_2$ metallic catalytic particles. As in the case of the Co—Mo series, it was observed that metallic catalytic particles containing only W/$SiO_2$ without Co did not form single-walled carbon nanotubes.

EXAMPLE 5

Figure 6:
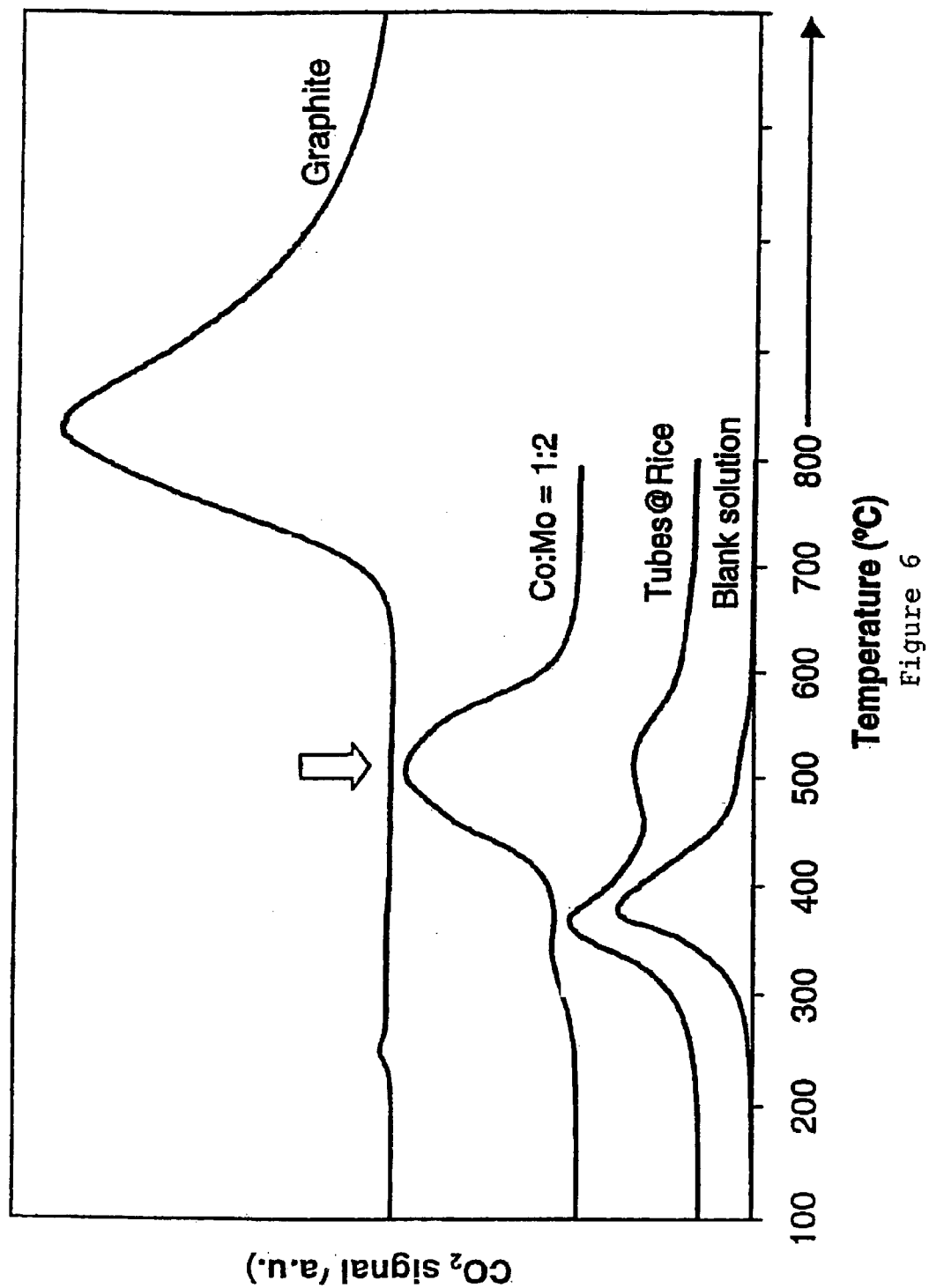
FIG. 6 is a Temperature Programmed Oxidation profile of products from CO disproportionation catalyzed by a Co:Mo/$SiO_2$ catalyst at 700° C.

Carbon species produced by using metallic catalytic particles containing a 6 wt % Co—Mo bimetallic catalyst (1:2 ratio) supported on silica by the same CO disproportion methodology as described in Example 1 were analyzed by the Temperature Programmed Oxidation method, as shown in FIG. 6.

TABLE I

Effect of Catalyst Support on Carbon Deposit Morphology

| Catalyst | Observed Morphology of Carbon Deposits |
|---|---|
| Co:Mo/$SiO_2$ | major amount of single-walled carbon nanotubes, minor amounts of multi-walled carbon nanotubes and graphite |
| Co:Mo/MCM-41 | major amount of single-walled carbon nanotubes, minor amounts of multi-walled carbon nanotubes and graphite |
| Co:Mo/$Al_2O_3$ | minor amounts of single- and multi-walled carbon nanotubes and graphite |
| Co:Mo/Mg (Al)O | minor amount of graphite, small amount of single-walled carbon nanotubes |
| Co:Mo/$ZrO_2$ | minor amount of graphite, small amount of single-walled carbon nanotubes |

For Temperature Programmed Oxidation analysis, 50 mg of sample obtained from the product of CO treatment at 700° C. was placed in a quartz tube reactor similar to that employed in Example 1. A continuous flow of 5% oxygen/95% helium was passed into the reactor, and the temperature of the furnace was increased from ambient temperature to 800° C. at a rate of 11° C. per minute, and then held at 800° C. for 1 hour. $CO_2$ evolution was measured by mass spectrometry to determine the amount of carbon species oxidized at each temperature.

Mass spectrometry measures the partial pressure of $CO_2$ in the quartz tube, which gives an arbitrary value. This value was then normalized by subtracting the background level, which was calculated following calibration with 100 $\mu l$ pulses of $CO_2$ and oxidation of known amounts of graphite. The adjusted value was directly proportional to the mol $CO_2$ oxidized at a particular temperature, which is directly proportional to the mol of a particular carbon species which is present in the sample. From these values, the percentage of the total solid product of the catalytic process represented by single-walled carbon nanotubes can be calculated.

The Temperature Programmed Oxidation profile of the carbon species produced on the Co:Mo/$SiO_2$ metallic catalytic particles (labeled "Co:Mo 1:2") presented a small oxidation peak centered at about 330° C., which is ascribed to the oxidation of amorphous carbon, and a major peak centered at about 510° C., which is marked in the figure with an arrow and ascribed to the oxidation of single-walled carbon nanotubes.

Two reference samples were also investigated by the Temperature Programmed Oxidation method and their profiles included in FIG. 6. The first reference (labeled "Graphite") was a graphite powder physically mixed with the Co:Mo/$SiO_2$ metallic catalytic particles. The oxidation of this form of carbon occurred at very high temperatures, starting at about 700° C., and completed after holding 30 minutes at 800° C.

The second reference sample was a commercial sample of purified single-walled carbon nanotubes, obtained from Tubes@Rice (Rice University, Houston, Tex.). This sample was provided in a liquid suspension of 5.9 grams/liter, containing a non-ionic surfactant Triton X-100. For Temperature Programmed Oxidation analysis, the Co:Mo/$SiO_2$ metallic catalytic particles were impregnated with the single-walled carbon nanotube suspension in a liquid/catalyst ratio of 1:1 by weight, in order to obtain approximately 0.6 wt % single-walled carbon nanotubes on the sample. The Temperature Programmed Oxidation profile of this impregnated sample (labeled "Tubes@Rice") exhibited two peaks, a low temperature peak that corresponds to the oxidation of the surfactant, and a second peak at about 510° C., which corresponds exactly to the position ascribed to the oxidation of single-walled carbon nanotubes. To determine that the first peak was indeed due to the oxidation of the surfactant, an identical sample with a blank solution containing only the surfactant in the same concentration was prepared. The Temperature Programmed Oxidation profile (labeled "Blank solution") matched the first peak of the "Tubes@Rice" profile, demonstrating that indeed this peak corresponds to the surfactant Triton.

The quantification of the amount of single-walled carbon nanotubes in the "Tubes@Rice" reference sample from the $CO_2$ produced by the Temperature Programmed Oxidation method gave a value of 0.64 wt %, which is in good agreement with the amount of single-walled carbon nanotubes loaded in the sample (0.6 wt %). This result demonstrates that the Temperature Programmed Oxidation method of the present invention can be used to directly quantify the percentage of a particular carbon species, such as single-walled carbon nanotubes, multi-walled carbon nanotubes, and amorphous carbon, present in a product obtained by the nanotube production method. Currently, no other method of directly quantifying the fraction of a total solid product of nanotube production represented by a particular carbon species exists.

EXAMPLE 6

Temperature Programmed Oxidation profiles of the products from CO disproportionation catalyzed by metallic catalytic particles containing the monometallic catalysts of Co or Mo supported on silica were generated by the method employed in Example 5 and were compared to the Temperature Programmed Oxidation profile of products from CO disproportionation catalyzed by the bimetallic catalyst. The Temperature Programmed Oxidation method clearly demonstrates the synergistic effect exhibited by Co and Mo, which was also observed by transmission electron microscopy as described in Example 2.

Figure 7:
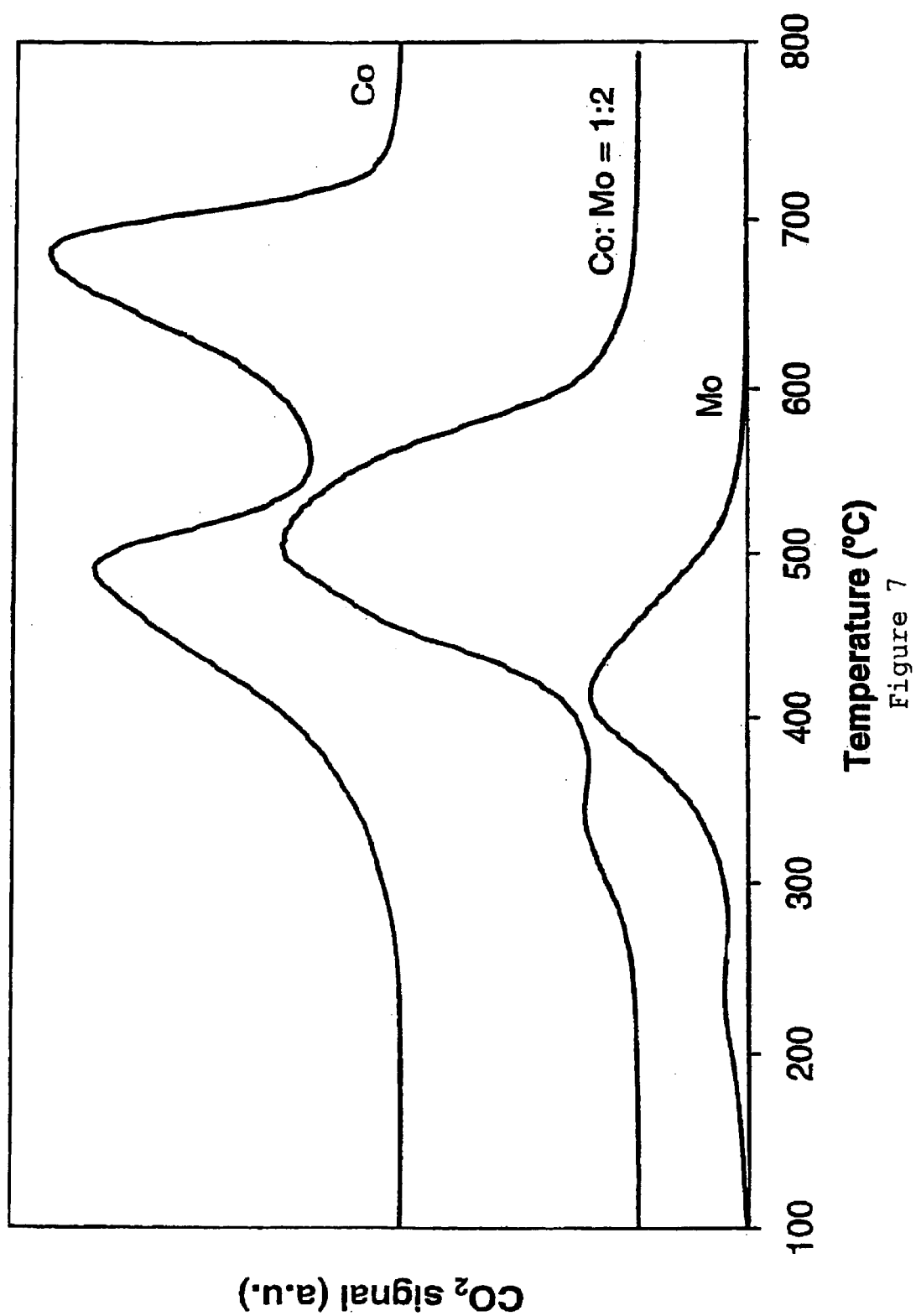
FIG. 7 is a Temperature Programmed Oxidation profile of products from CO disproportionation catalyzed by a Co catalyst on $SiO_2$, a Mo catalyst on $SiO_2$, and a Co:Mo catalyst on $SiO_2$ at 700° C.

As shown in FIG. 7, the Temperature Programmed Oxidation profile of the sample containing Mo/SiO$_2$ metallic catalytic particles (labeled "Mo") indicates that Mo alone does not produce carbon nanotubes; the "Mo" Temperature Programmed Oxidation profile only contains a small low-temperature peak corresponding to amorphous carbon. Similarly, the Temperature Programmed Oxidation profile of the sample containing Co/SiO$_2$ metallic catalytic particles (labeled "Co") indicates that Co alone is not selective for the production of single-walled carbon nanotubes and generates mainly graphitic carbon and multi-walled carbon nanotubes, which, as described above, are oxidized at higher temperatures than single-walled carbon nanotubes. By contrast, the combination of the two metals results in high selectivity for single-walled carbon nanotubes, and the sample containing Co:Mo/SiO$_2$ metallic catalytic particles (labeled "Co:Mo= 1:2", wherein the Co:Mo ratio was 1:2), exhibits a large peak centered at about 510° C. and is ascribed to single-walled carbon nanotubes. Because no other peaks are evident, it can be assumed that single-walled carbon nanotubes are provided as a large percentage of the total solid product of nanotube production.

The percentages of single-walled carbon nanotubes, amorphous carbon, and multi-walled carbon nanotubes and graphite present in the catalytic products are listed in Table II.

EXAMPLE 7

Temperature Programmed Oxidation profiles of the products from CO disproportionation catalyzed by metallic catalytic

TABLE II

Synergistic Effect Exhibited by Co and Mo

Figure 8:
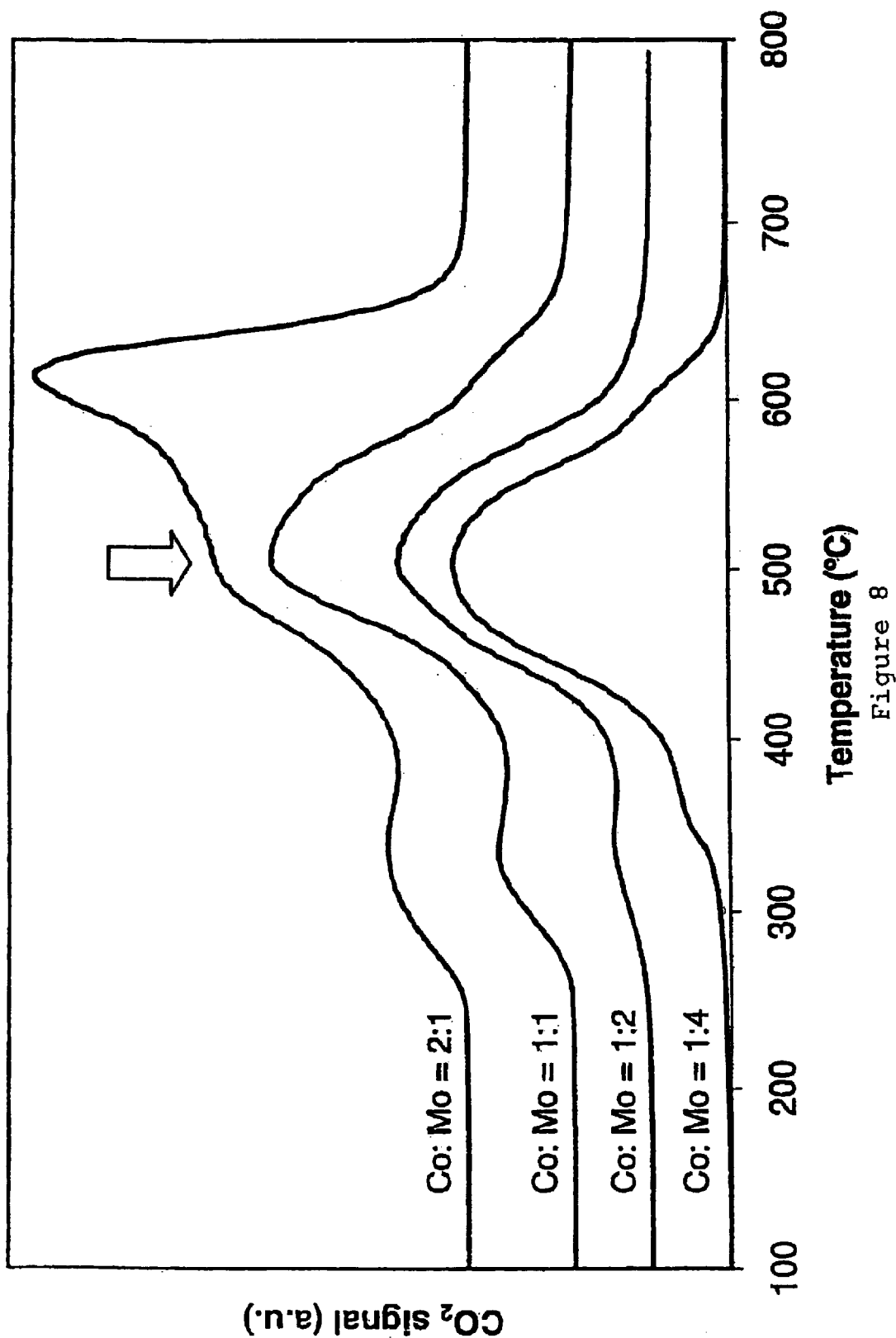
FIG. 8 is a Temperature Programmed Oxidation profile of products from CO disproportionation catalyzed by Co:Mo catalysts on $SiO_2$ at 700° C. in which the molar ratio of Co to Mo is varied.

| Catalyst | Amorphous Carbon % | Single-Walled Carbon Nanotubes % | Multi-Walled Carbon Nanotubes and Graphite % |
|---|---|---|---|
| Co | 38 | 11 | 51 |
| Mo | 95 | 5 | 0 |
| Co:Mo (1:2) | 8 | 88 | 4 | particles containing Co:Mo bimetallic catalysts at Co:Mo ratios of 1:4, 1:2, 1:1 and 2:1 were compared to determine the effect of varying the Co:Mo molar ratio in the Co:Mo/SiO$_2$ metallic catalytic particles. The Temperature Programmed Oxidation profiles were generated by the same methodology as described in Example 5. As shown in FIG. 8, the Co:Mo/SiO$_2$ metallic catalytic particles containing Co:Mo molar ratios of 1:2 and 1:4 exhibited the highest selectivities towards single-walled carbon nanotubes. The arrow indicates the center of the peak corresponding to the oxidation of single-walled carbon nanotubes. The Temperature Programmed Oxidation profile of these samples indicate that these catalysts produced mostly single-walled carbon nanotubes, with a small amount of amorphous carbon. An increase in the Co:Mo ratio did not enhance the production of single-walled carbon nanotubes, but it did accelerate the formation of multi-walled carbon nanotubes and graphitic carbon, as shown by the increasing size of the peaks in the region of about 600° C. to about 700° C. of the Temperature Programmed Oxidation profile labeled "Co:Mo=2:1".

From the Temperature Programmed Oxidation profiles of FIG. 8, selectivity values for each of the catalysts were estimated, and are listed in Table III.

TABLE III

Effect of Co:Mo Molar Ratio on Production of Single-walled Carbon Nanotubes

| Co:Mo Catalyst Molar Ratio | Amorphous Carbon % | Single-Walled Carbon Nanotubes % | Multi-Walled Carbon Nanotubes and Graphite % |
|---|---|---|---|
| 2:1 | 12 | 57 | 31 |
| 1:1 | 16 | 80 | 4 |
| 1:2 | 8 | 88 | 4 |
| 1:4 | 5 | 94 | 1 |

EXAMPLE 8

Figure 9:
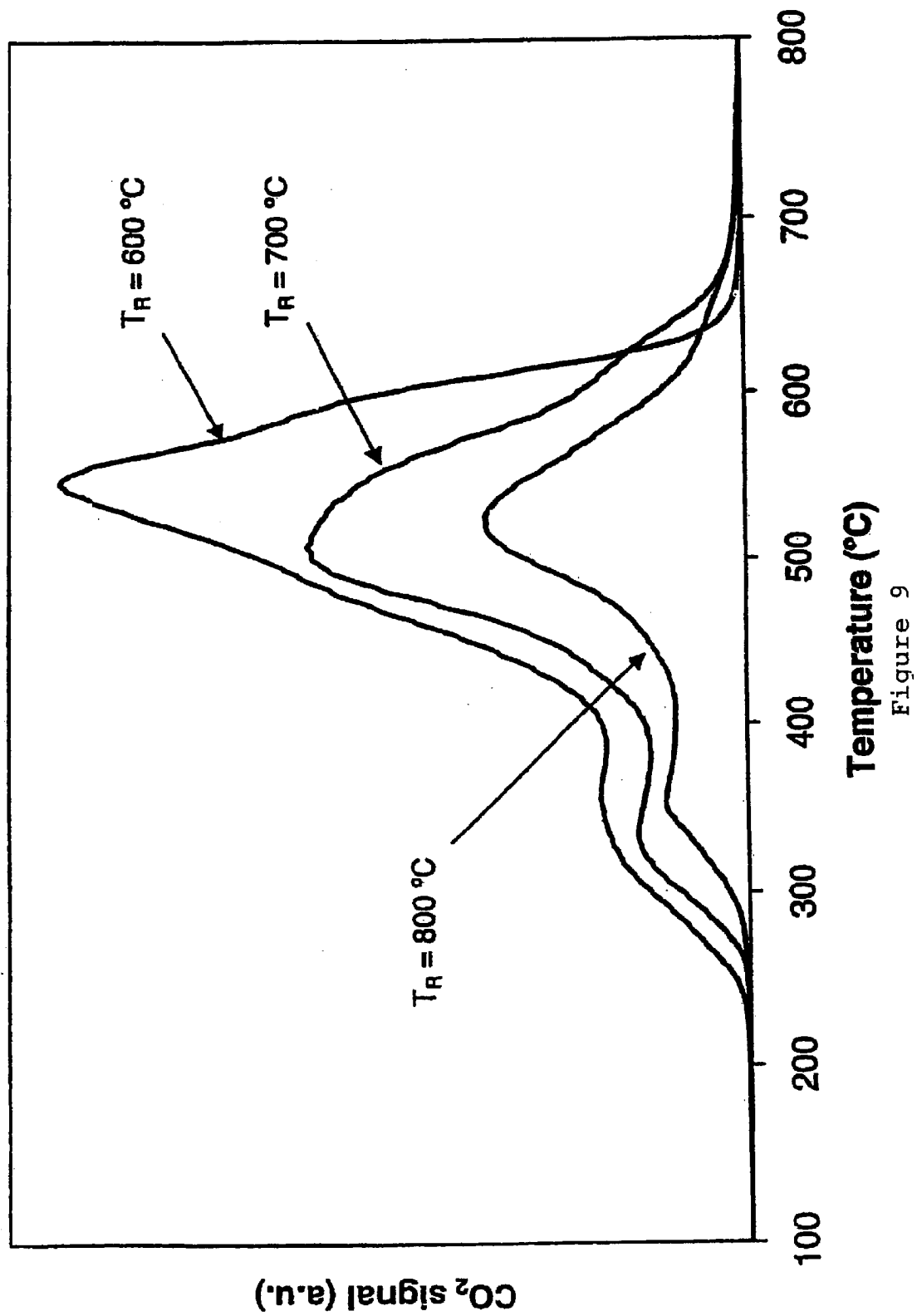
FIG. 9 is a Temperature Programmed Oxidation profile of products from CO disproportionation catalyzed by Co:Mo/$SiO_2$ catalyst in which the reaction temperature is varied.
Figure 10:
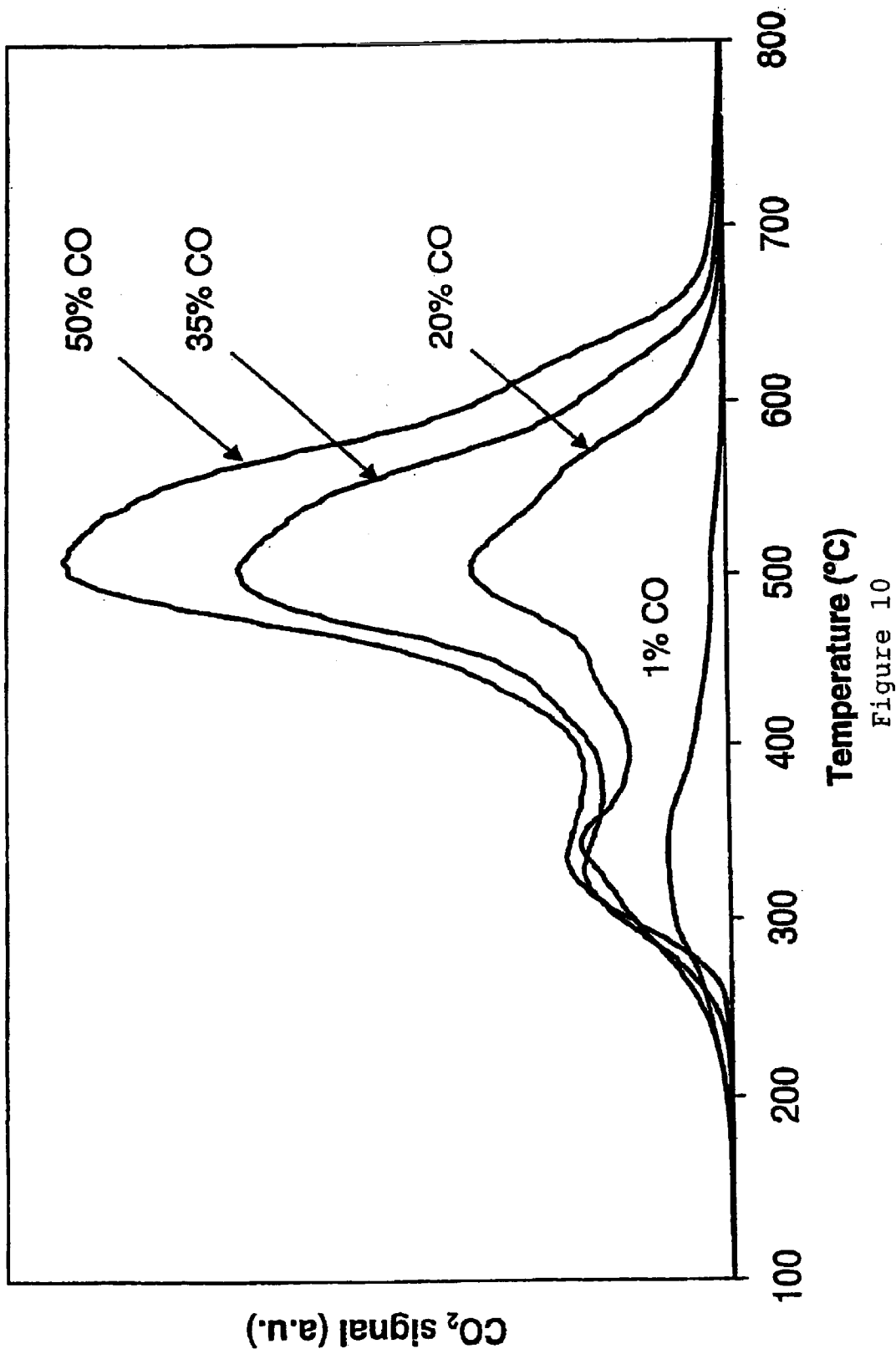
FIG. 10 is a Temperature Programmed Oxidation profile of products from CO disproportionation catalyzed by Co:Mo/$SiO_2$ catalyst at 700° C. in which the percentage of CO in the carbon-containing gas used in CO disproportionation is varied.
Figure 11:
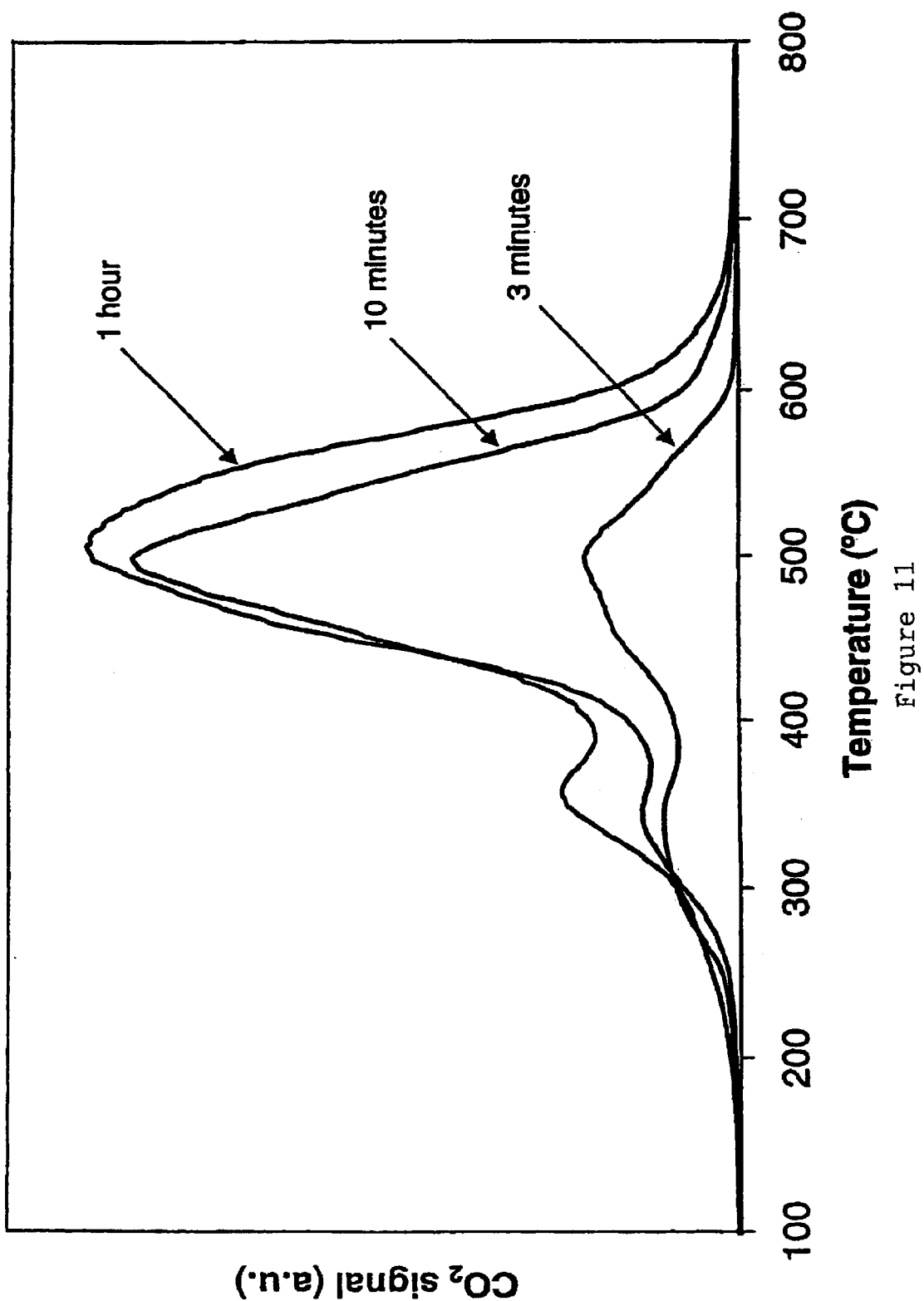
FIG. 11 is a Temperature Programmed Oxidation profile of products from CO disproportionation catalyzed by Co:Mo/$SiO_2$ catalyst at 700° C. in which the reaction time of CO disproportionation is varied.

FIGS. 9–11 demonstrate the use of the Temperature Programmed Oxidation technique to optimize reaction conditions. CO disproportionation was catalyzed by Co:Mo/SiO$_2$ metallic catalytic particles (1:1 molar ratio), and the methodology used was similar to that described in Example 1, with the exceptions that in FIG. 9 the reaction temperature varied, in FIG. 10 the concentration of CO varied, and in FIG. 11 the reaction time varied. The products of CO disproportionation were analyzed by the Temperature Programmed Oxidation method described in Example 5.

In FIG. 9, Temperature Programmed Oxidation profiles of carbon species produced when the temperature of the reactor was 600° C., 700° C. and 800° C. are shown. These profiles demonstrate that the amount of carbon deposited increases as the temperature decreases; however, the selectivity to single-walled carbon nanotubes is lower at lower temperatures. The Temperature Programmed Oxidation technique can be used to identify the optimum reaction temperature for any particular catalyst, and in this case, the optimum temperature is 700° C. The percentages of the catalytic products represented by single-walled carbon nanotubes, amorphous carbon, and multi-walled carbon nanotubes and graphite are listed in Table IV.

TABLE IV

Effect of Reaction Temperature on Production of Single-Walled Carbon Nanotubes

| Temperature | Amorphous Carbon % | Single-Walled Carbon Nanotubes % | Multi-Walled Carbon Nanotubes and Graphite % |
|---|---|---|---|
| 600° C. | 16 | 55 | 29 |
| 700° C. | 16 | 80 | 4 |
| 800° C. | 25 | 61 | 14 |

In FIG. 10, Temperature Programmed Oxidation profiles of carbon species produced when the concentration of CO in the carbon-containing gas is 1%, 20%, 35% and 50% are shown. These profiles indicate that the amount of single-walled carbon nanotubes produced is a strong function of the concentration of CO in the carbon-containing gas.

In FIG. 11, Temperature Programmed Oxidation profiles of carbon species produced when the reaction time was 3 minutes, 10 minutes and 1 hour are shown. The reaction time refers to the time in which the reactor was held at 700° C. and the CO was in contact with the metallic catalytic particles. These Temperature Programmed Oxidation profiles demonstrate that the yield of single-walled carbon nanotubes significantly increases with time during the first 10 minutes, but the growth is much less pronounced beyond that time.

Now it will be understood that the Temperature Programmed Oxidation method is a catalytic process in which the metals present in the sample catalyze the oxidation of the carbon species. Therefore, if the nature of the catalyst is significantly changed, the position of the oxidation peaks may appear shifted from the peaks described in the previous examples, even though the carbon structures represented by the peaks are the same. For example, it has been observed that modification of the catalyst support may result in such shifts. Therefore, for each catalyst used in the methods of the present invention, a complete Temperature Programmed Oxidation analysis of the catalyst as well as operating conditions should be performed with the appropriate references to identify peak shifts as well as optimum operating conditions.

Changes may be made in the construction and the operation of the various components, elements and assemblies described herein or in the steps or the sequence of steps of the methods described herein without departing from the spirit and scope of the invention as defined in the following claims.

What is claimed is:

1. A catalytic product, comprising;
   Co and Mo in a ratio of one part Co to at least two or more parts of Mo; and
   a support material, and wherein the Co, Mo and support material are combined as a catalytic particle; and
   a single-walled carbon nanotube deposited on the catalytic particle.

2. The catalytic product of claim 1 further comprising an additional Group VIII metal.

3. The catalytic product of claim 1 further comprising an additional Group VIb metal.

4. The catalytic product of claim 1 wherein the support material comprises at least one of an oxidic support, silica, a molecular sieve, MCM-41, alumina, MgO, $ZrO_2$, aluminum-stabilized magnesium oxide, and a molecular sieve zeolite.

5. The catalytic product of claim 1 comprising from about 1% to about 20% by weight of Co and Mo.

6. A catalytic product, comprising:
   at least one of Ru, Rh, Pd, Ir, Pt, at least one Group VIb metal, and a support material, combined as a catalytic particle wherein the support material comprises at least one of an oxidic supoort, silica, a molecular sieve, MCM-41, alumina, MgO, $ZrO_2$, aluminum-stabilized magnesium oxide, or a molecular sieve zeolite; and
   a single-walled carbon nanotube deposited on the catalytic particle.

7. The catalytic product of claim 6 wherein the at least one Group VIb metal is selected from the group consisting of Cr, Mo and W.

8. The catalytic product of claim 6 comprising Ru.

9. The catalytic product of claim 6 comprising Rh.

10. The catalytic product of claim 6 comprising Pd.

11. The catalytic product of claim 6 comprising Ir.

12. The catalytic product of claim 6 comprising Pt.

13. The catalytic product of claim 6 comprising from about 1% to about 20% by weight of the at least one Ru, Rh, Pd, Ir and Pt and the at least one Group VIb metal.

14. A catalytic product, comprising:
   at least one Group VIII metal, excluding Fe, at least one of Cr, Mo and W, and a support material wherein the support material comprises at least one of an oxidic support, silica, a molecular sieve, MCM-41, alumina, MgO, $ZrO_2$, aluminum-stabilized magnesium oxide, or a molecular sieve zeolite, and wherein the Group VIII metal, the at least one of Cr, Mo and W, and the support material are combined as a catalytic particle, excluding a catalytic particle consisting of the support material and Co and W or the support material and Co and Mo; and
   a single-walled carbon nanotube deposited on the catalytic particle.

15. The catalytic product of claim 14 wherein the at least one Group VIII metal is selected from the group consisting of Co, Ni, Ru, Rh, Pd, Ir and Pt.

16. The catalytic product of claim 14 comprising Cr.

17. The catalytic product of claim 14 comprising W.

18. The catalytic product of claim 14 comprising Mo.

19. The catalytic product of claim 14 comprising from about 1% to about 20% by weight of the at least one Group VIII metal and the at least one of Cr, Mo and W.

20. A catalytic product, comprising:
   Co and Mo in a ratio of one part Co to at least two or more parts of Mo, and a silica support material, wherein the Co, Mo and silica support material are combined as a catalytic particle; and
   a single-walled carbon nanotube deposited on the catalytic particle.

21. The catalytic product of claim 20 further comprising an additional Group VIII metal.

22. The catalytic product of claim 20 further comprising an additional Group VIb metal.

23. The catalytic product of claim 20 comprising from about 1% to about 20% by weight of Co and Mo.

24. A catalytic product, comprising:

a catalytic particle comprising Co and Mo disposed on an oxidic support, silica, alumina, a molecular sieve, MCM-41, MgO, $ZrO_2$, aluminum-stabilized magnesium oxide, or a molecular sieve zeolite support material; and a single-walled carbon nanotube disposed on the catalytic particle.

25. The catalytic product of claim 24 further comprising an additional Group VIII metal.

26. The catalytic product of claim 24 further comprising an additional Group VIb metal.

27. The catalytic product of claim 24 comprising from about 1% to about 20% by weight of Co and Mo.

* * * * *

UNITED STATES PATENT AND TRADEMARK OFFICE
CERTIFICATE OF CORRECTION

PATENT NO. : 6,962,892 B2
APPLICATION NO. : 10/754002
DATED : November 8, 2005
INVENTOR(S) : Daniel E. Resasco et al.

It is certified that error appears in the above-identified patent and that said Letters Patent is hereby corrected as shown below:

Column 2, Line 30: Delete the word "lanthamides" and replace with --lanthanides--.

Signed and Sealed this

Third Day of October, 2006

JON W. DUDAS
*Director of the United States Patent and Trademark Office*